(12) United States Patent
Law

(10) Patent No.: US 10,885,048 B2
(45) Date of Patent: Jan. 5, 2021

(54) TIME-SERIES PATTERN MATCHING SYSTEM

(71) Applicant: TD Ameritrade IP Company, Inc., Omaha, NE (US)

(72) Inventor: Sean Ming-Yin Law, Ann Arbor, MI (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 136 days.

(21) Appl. No.: 16/272,366

(22) Filed: Feb. 11, 2019

(65) Prior Publication Data

US 2020/0257686 A1 Aug. 13, 2020

(51) Int. Cl.
| | |
|---|---|
| *G06F 16/30* | (2019.01) |
| *G06F 16/2458* | (2019.01) |
| *G06F 16/2455* | (2019.01) |
| *G06K 9/62* | (2006.01) |
| *G06F 16/28* | (2019.01) |

(52) U.S. Cl.
CPC ...... *G06F 16/2477* (2019.01); *G06F 16/2456* (2019.01); *G06F 16/287* (2019.01); *G06K 9/6215* (2013.01); *G06K 9/6218* (2013.01)

(58) Field of Classification Search
CPC . G06F 16/24; G06F 16/9024; G06F 16/90394
USPC ........ 707/609, 687, 705, 769, 790, 813, 821
See application file for complete search history.

(56) References Cited

U.S. PATENT DOCUMENTS

| | | | | |
|---|---|---|---|---|
| 2009/0006399 | A1* | 1/2009 | Raman | G06F 16/2456 |
| 2010/0125594 | A1* | 5/2010 | Li | G06F 16/90344 |
| | | | | 707/758 |
| 2010/0211924 | A1* | 8/2010 | Begel | G06F 16/9024 |
| | | | | 717/101 |
| 2010/0328115 | A1* | 12/2010 | Binnig | G06F 16/24561 |
| | | | | 341/51 |
| 2014/0082006 | A1* | 3/2014 | Knight | G06F 16/24 |
| | | | | 707/758 |

(Continued)

OTHER PUBLICATIONS

U.S. Appl. No. 16/588,497, filed Sep. 30, 2019, Sean Ming-Yin Law.

(Continued)

*Primary Examiner* — Sana A Al-Hashemi
(74) *Attorney, Agent, or Firm* — Harness, Dickey & Pierce, P.L.C.

(57) ABSTRACT

A system includes a pattern engine that, in response to selection by a user of a first data set, generates a similarity self-join of the first data set for a specified length. The similarity self-join indicates, for each reference subsequence, a minimum value of distances between the reference subsequence and other subsequences within the first data set. A user portal generates a user interface visually representing the first data set and identifying two subsequences that correspond to the lowest value of the similarity self-join. An alert system receives an alert request specifying a second data set and a pattern specification. An incremental pattern engine generates an initial state of a similarity join of the second data set and the pattern specification. In response to data being received for the first data set, the alert system transmits an alert message if any value of the similarity join meets a threshold.

20 Claims, 10 Drawing Sheets

(56) References Cited

U.S. PATENT DOCUMENTS

2018/0276598 A1* 9/2018 Y .................. A41D 1/002

OTHER PUBLICATIONS

Yeh, et al; Matrix Profile VI: Meaningful Multidimensional Motif Discovery; 2017; 10 pages.
Mueen, Abdullah et al.; Matrix Profile Tutorial, Part 1; Time Series Data Mining Using the Matrix Profile: A Unifying View of Motif Discovery, Anomaly Detection, Segmentation, Classification, Clustering and Similar Joins; KDD2017; 110 pages.
Mueen, Abdullah et al.; Matrix Profile Tutorial, Part 2; Time Series Data Mining Using the Matrix Profile: A Unifying View of Motif Discovery, Anomaly Detection, Segmentation, Classification, Clustering and Similar Joins; KDD2017; 110 pages.
UCR Matrix Profile Page; available at https://www.cs.ucr.edu/~eamonn/MatrixProfile.html; retrieved Nov. 3, 2018; 4 pages.
Yeh et al.; Matrix Profile I: All Pairs Similarity Joins for Time Series: A Unifying View that Includes Motifs, Discords and Shapelets; 2016; IEEE ICDM 2016; 10 pages.
Zhu et al.; Matrix Profile II: Exploiting a Novel Algorithm and GPUs to break the one Hundred Million Barrier for Time Series Motifs and Joins; 2016; EEE ICDM 2016; 10 pages.
Yeh et al.; Matrix Profile III: The Matrix Profile allows Visualization of Salient Subsequences in Massive Time Series; 2016; IEEE ICDM 2016; 10 pages.
Yeh et al.; Matrix Profile IV: Using Weakly Labeled Time Series to Predict Outcomes; VLDB 2017; 11 pages.
Dau et al.; Matrix Profile V: A Generic Technique to Incorporate Domain Knowledge into Motif Discovery; KDD'17; 10 pages.
Yeh et al.; Matrix Profile VI: Meaningful Multidimensional Motif Discovery; ICDM 2017; 10 pages.
Zhu et al; Matrix Profile VII: Time Series Chains: A New Primitive for Time Series Data Mining; ICDM 2017; 10 pages.
Gharghabi et al.; Matrix Profile VIII: Domain Agnostic Online Semantic Segmentation at Superhuman Performance Levels; ICDM 2017; 10 pages.
Zhu et al.; Matrix Profile IX: Admissible Time Series Motif Discovery with Missing Data; Feb. 2018; 9 pages.
Linardi et al.; Matrix Profile X: VALMOD—Scalable Discovery of Variable-Length Motifs in Data Series; SIGMOD 2018; 14 pages.
Zhu et al.; Matrix Profile XI: SCRIMP++: Time Series Motif Discovery at Interactive Speed; ICDM 2018; 10 pages.
Gharghabi et al.; An Ultra-Fast Time Series Distance Measure to allow Data Mining in more Complex Real-World Deployments; Matrix Pro?le XII: MPdist: A Novel Time Series Distance Measure to Allow Data Mining in More Challenging Scenarios; ICDM 2018; 34 pages.
Imani et al.; Matrix Profile XIII: Time Series Snippets: A New Primitive for Time Series Data Mining; 2018; 10 pages.
Zimmerman et al.; Matrix Profile XIV: Scaling Time Series Motif Discovery with GPUs: Breaking the Quintillion Pairwise Comparisons a Day Barrier; 2018; 14 pages.
Yeh et al.; Time Series Joins, Motifs, Discords and Shapelets: a Unifying View that Exploits the Matrix Profile; Jun. 12, 2017; 41 pages.
Zhu et al.; Exploiting a Novel Algorithm and GPUs to Break the Ten Quadrillion Pairwise Comparisons Barrier for Time Series Motifs and Joins; KAIS Journal; Nov. 2017; 34 pages.
Silva et al.; SIMPLE: Assessing Music Similarity Using Subsequences; 2016; ISMIR 2016; 7 pages.
Silva et al.; Fast Similarity Matrix Profile for Music Analysis and Exploration; 2017; IEEE Transactions on Multimedia; 10 pages.
Zhu et al.; Time Series Chains: A Novel Tool for Time Series Data Mining; IJCAI 2018; 5 pages.
Linardi et al.; VALMOD: A Suite for Easy and Exact Detection of Variable Length Motifs in Data Series; 2018; SIGMOD Conference 2018; 4 pages.
Gharghabi et al.; Domain Agnostic Online Semantic Segmentation for Multi-Dimensional Time Series; Sep. 2018; 130 pages.
Senobari et al.; Super-Efficient Cross-Correlation (SEC-C): A Fast Matched Filtering Code Suitable for Desktop Computers; 2018; Seismological Research Letters; 13 pages.
Zhu et al.; The Swiss Army Knife of Time Series Data Mining: Ten Useful Things you can do with the Matrix Profile and Ten Lines of Code; 2019.
Senobari et al.; Using the similarity Matrix Profile to investigate foreshock behavior of the 2004 Parkfield earthquake; Abstract; American Geophysical Union (2018); 1 page.

* cited by examiner

TIME-SERIES PATTERN MATCHING SYSTEM

FIELD

The present disclosure relates to systems and methods for analyzing time-series data and more particularly to identifying similar subsequences within time-series data.

BACKGROUND

When a user is making trading decisions, such as whether to buy or sell equities or options contracts, they may use a user device 100 (see FIG. 1) to manually review time-series charts 104. For example, when considering whether to buy a stock, the user may display a time series of closing prices for that stock for some period of time on the user device 100. Based on heuristics developed over time, the user may assess whether the stock is a worthwhile investment. Following that manual review, the user device 100 may be used to communicate trading decisions to a trading system 108.

The shortcomings of this approach are numerous. While reference materials are available to teach users about investment strategies, such as attempting to identify patterns that signal technological innovations prior to a spike in stock price, investment intuition still requires significant experience. In addition, identifying favorable trends or making favorable predictions to inform an investing strategy can take a substantial amount of time and computational power. Further, any periods where the investor is not monitoring news and other statistics may result in missed opportunities to take advantage of their intuition. As a result, this model scales poorly to investors who can devote less than full time to monitor investments. Further, even for those people who are professional investors, applying their intuition broadly across a large set of investments remains impractical and, until now, was computationally intractable for large amounts of data.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a pattern engine configured to, in response to selection by a user of a first data set, generate a similarity self-join of the first data set for a specified length. The similarity self-join indicates, for each reference subsequence of the specified length within the first data set, a minimum value of distances between the reference subsequence and other subsequences of the specified length within the first data set. The system includes a user portal configured to generate a user interface for display to the user. The user interface includes a visual representation of the first data set and selectively visually identifies two subsequences within the first data set that correspond to a lowest value of the similarity self-join. The system includes an alert system configured to receive an alert request from the user. The alert request specifies a second data set and a pattern specification. The pattern specification is characterized by a first length. The system includes an incremental pattern engine configured to generate an initial state of a similarity join of the second data set and the pattern specification. The similarity join indicates, for each reference subsequence of the first length within the first data set, a distance between the pattern specification and the reference subsequence. The incremental pattern engine is configured to update the similarity join in response to data received for the first data set subsequent to generation of the initial state. The alert system is configured to, in response to data being received for the first data set, identify whether any value of the similarity join meets a predetermined threshold, and, in response to identifying a first value of the similarity join that meets the predetermined threshold, selectively transmit an alert message to the user.

In other features, distance between two subsequences is calculated using z-normalized Euclidean distance. In other features, the similarity self-join generated by the pattern engine is a full similarity self-join of the first data set for the specified length. The full similarity self-join indicates, for each reference subsequence of the specified length within the first data set, a minimum value of distances between the reference subsequence and all other subsequences of the specified length within the first data set.

In other features, the pattern engine also generates an index having values that correspond one-to-one with values of the similarity self-join. For each value of the similarity self-join, the value indicates a subsequence that is closest to a corresponding reference sequence, and the corresponding value of the index identifies a position of the closest subsequence within the first data set.

In other features, the user portal is configured to, in response to selection of a first subsequence, select from the index the value corresponding to the first subsequence and visually identify a second subsequence indicated by the selected value. In other features, the user portal is configured to generate a display overlaying a plot of the first subsequence and a plot of the second subsequence.

In other features, the similarity self-join includes, for each reference subsequence, k values indicating distances between the reference subsequence and k closest subsequences in the first data set. The variable k is an integer greater than or equal to one. In other features, the user portal is configured to, in response to selection of a first subsequence, visually identify k subsequences that are closest in distance to the first subsequence. In other features, the user portal is configured to generate a display overlaying a plot of the first subsequence and plots of the k identified subsequences.

In other features, the user portal is configured to update k according to Input from the user. In other features, the user portal is configured to, in response to selection of a first subsequence, visually identify a second subsequence that is closest in distance to the first subsequence. In other features, the predetermined threshold is a maximum threshold. The alert system is configured to transmit the alert message in response to a value of the similarity join being less than the predetermined threshold. In other features, the user portal is configured to generate a user interface element that, based on input from the user, adjusts the specified length.

In other features, the first data set is time-series data with data points corresponding to monotonically increasing time. The pattern engine is configured to generate left and right self-joins of the first data set for the specified length. The left self-join indicates, for each reference subsequence of the specified length within the first data set, a minimum value of distances between the reference subsequence and other subsequences of the specified length prior to the reference subsequence within the first data set. The right self-join indicates, for each reference subsequence of the specified length within the first data set, a minimum value of distances between the reference subsequence and other subsequences of the specified length subsequent to the reference subsequence within the first data set.

A method includes, in response to selection by a user of a first data set, generating a similarity self-join of the first data set for a specified length. The similarity self-join indicates, for each reference subsequence of the specified length within the first data set, a minimum value of distances between the reference subsequence and other subsequences of the specified length within the first data set. The method includes generating a user interface for display to the user. The user interface includes a visual representation of the first data set and is configured to selectively visually identify two subsequences within the first data set that correspond to a lowest value of the similarity self-join. The method includes receiving an alert request from the user. The alert request specifies a second data set and a pattern specification. The pattern specification is characterized by a first length. The method includes generating an initial state of a similarity join of the second data set and the pattern specification. The similarity join indicates, for each reference subsequence of the first length within the first data set, a distance between the pattern specification and the reference subsequence. The method includes updating the similarity join in response to data received for the first data set subsequent to generation of the initial state. The method includes, in response to data being received for the first data set, identifying whether any value of the similarity join meets a predetermined threshold, and in response to identifying a first value of the similarity join that meets the predetermined threshold, selectively transmitting an alert message to the user.

In other features, the method includes determining the distance between each pair of subsequences by calculating z-normalized Euclidean distance between the pair of subsequences. In other features, the method includes generating an index having values that correspond one-to-one with values of the similarity self-join. For each value of the similarity self-join, the value indicates a subsequence that is closest to a corresponding reference sequence, and the corresponding value of the index identifies a position of the closest subsequence within the first data set. The method includes, in response to user selection of a first subsequence selecting from the index the value corresponding to the first subsequence and visually identifying a second subsequence indicated by the selected value.

In other features, generating the similarity self-join includes, for each reference subsequence, storing k values indicating distances between the reference subsequence and k closest subsequences in the first data set. The variable k is an integer greater than or equal to one that is adjusted according to input from the user. The method includes, in response to selection of a first subsequence, identifying k subsequences that are closest in distance to the first subsequence and generating a display overlaying a plot of the first subsequence and plots of the k identified subsequences.

In other features, the first data set is time-series data with data points corresponding to monotonically increasing time. In other features, generating the similarity self-join includes generating left and right self-joins of the first data set for the specified length. The left self-join indicates, for each reference subsequence of the specified length within the first data set, a minimum value of distances between the reference subsequence and other subsequences of the specified length prior to the reference subsequence within the first data set. The right self-join indicates, for each reference subsequence of the specified length within the first data set, a minimum value of distances between the reference subsequence and other subsequences of the specified length subsequent to the reference subsequence within the first data set.

A non-transitory computer-readable medium includes instructions including, in response to selection by a user of a first data set, generating a similarity self-join of the first data set for a specified length. The similarity self-join indicates, for each reference subsequence of the specified length within the first data set, a minimum value of distances between the reference subsequence and other subsequences of the specified length within the first data set. The instructions include generating a user interface for display to the user. The user interface includes a visual representation of the first data set and selectively visually identifies two subsequences within the first data set that correspond to a lowest value of the similarity self-join. The instructions include receiving an alert request from the user. The alert request specifies a second data set and a pattern specification. The pattern specification is characterized by a first length. The instructions include generating an initial state of a similarity join of the second data set and the pattern specification. The similarity join indicates, for each reference subsequence of the first length within the first data set, a distance between the pattern specification and the reference subsequence. The instructions include updating the similarity join in response to data received for the first data set subsequent to generation of the initial state. The instructions include, in response to data being received for the first data set, identifying whether any value of the similarity join meets a predetermined threshold, and, in response to identifying a first value of the similarity join that meets the predetermined threshold, selectively transmitting an alert message to the user.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
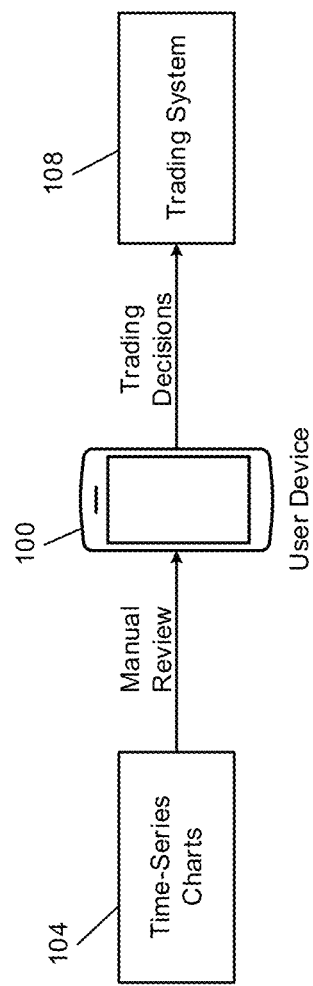
FIG. 1 is a functional block diagram of an example investment system according to the prior art.
Figure 2:
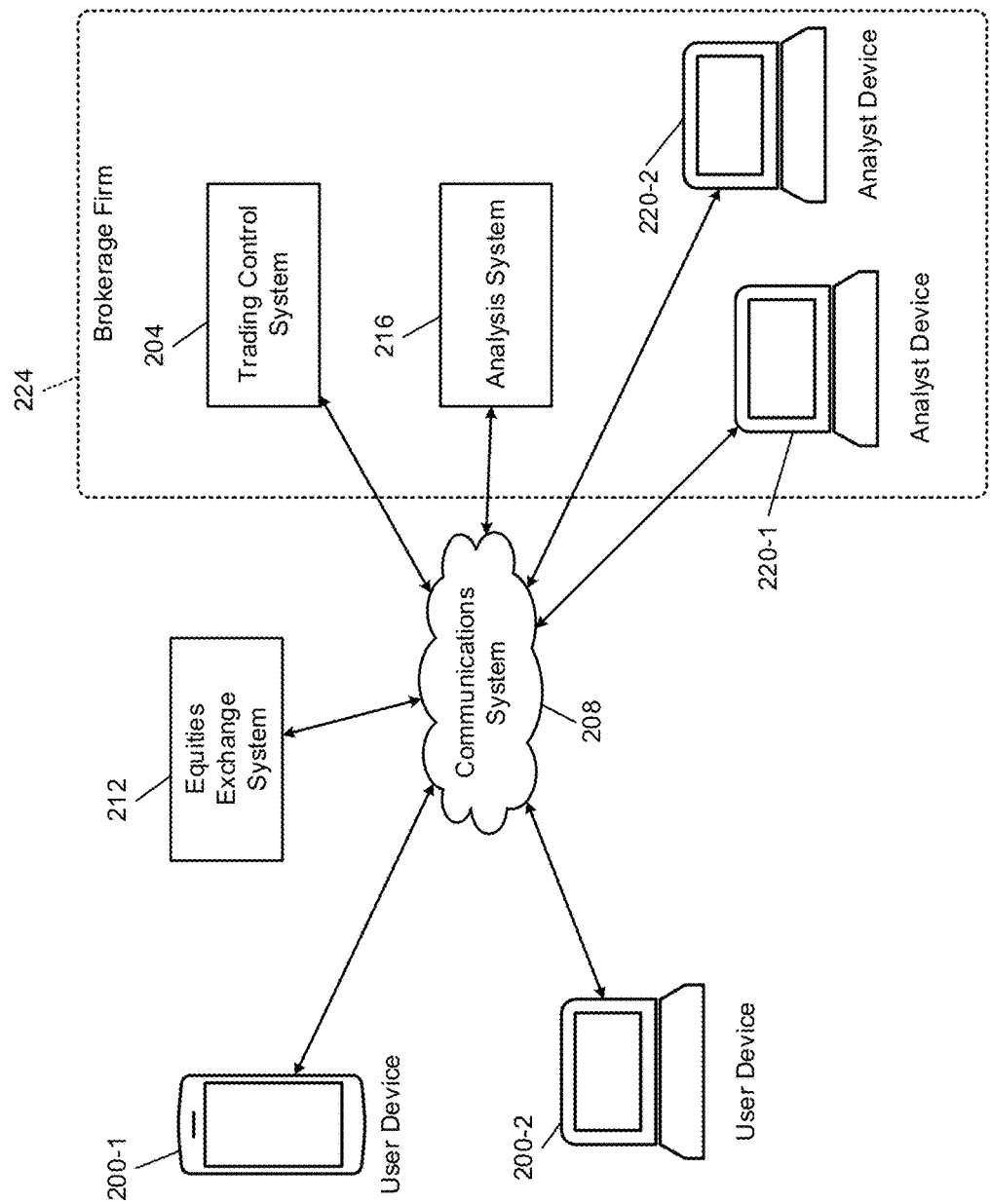
FIG. 2 is a block diagram of an example investing environment including an analysis system according to the principles of the present disclosure.

In FIG. 2, user devices 200-1 and 200-2 (collectively, user devices 200) communicate with a trading control system 204 via a communications system 208, which may include the Internet, as described in more detail below. Investors using the respective user devices 200 can instruct the trading control system 204 to purchase or sell investments, such as equities, options, and futures. Based on these instructions, the trading control system 204 may interact with, as an example, an equities exchange system 212.

In order to make investing decisions, investors of the respective user device 200 may access an analysis system 216. The analysis system 216 stores and presents data to the investors that help the investors to assess their portfolios and make investment decisions. Analyst devices 220-1 and 220-2 (collectively, analyst devices 220) may also use the analysis system 216 to evaluate portfolios of investors, to provide advice, and to identify patterns of potential interest to investors.

The analyst devices 220, the analysis system 216, and the trading control system 204 may all be owned and/or operated by a single entity, such as a brokerage firm, indicated schematically at 224. The analyst devices 220 may communicate with the analysis system 216 via the communications system 208. In some implementations, portions of the communications system 208 may be owned and/or operated by the brokerage firm 224 despite them being shown in FIG. 2 as outside of the brokerage firm 224. For example, the communications resources used for communication between the trading control system 204, the analysis system 216, and the analyst devices 220 may be partially or wholly owned and/or operated by the brokerage firm 224.

As described in more detail below, the analysis system 216 may help investors, such as those using the user devices 200, to identify patterns within time-series data. For example, the time-series data may include closing prices of equities, prices updated on a more frequent basis (such as on an hourly basis or even by the minute or second), metrics such as price/earnings ratio, trading volume, market capitalization, volatility, and statistical values such as option Greeks.

Certain patterns may indicate to investors that an event may be more likely than usual. For example, a certain pattern may presage a stock price decrease for a company following a below-expectations earnings report. Other patterns may signal a decrease in confidence in the equity by institutional investors. Further, there may be correlations and relationships across multiple securities? For example, a pattern observed for stock A could signal a likelihood of a change in stock B. These sorts of relationships may exist, for example, in supply chains where company B depends on supplies from company A.

The analysis system 216 applies a unique approach to identifying, displaying, and allowing investors to leverage patterns that appear in data. While identifying patterns within time-series data has been theoretically possible using brute-force approaches or approximations, optimizations developed over time have still resulted in a computationally-intensive, storage-intensive, and brittle process for identifying patterns. Further, these optimizations may discard data or result in false negatives (failing to identify repeated patterns that have occurred in the time-series data). In contrast, the present disclosure uses a technique referred to as a matrix profile, which allows for exponentially faster time-series comparisons without optimizations that may result in false negatives. Further, the matrix profile does not gain speed advantages at the expense of requiring dramatically more storage space. Because of the speed advantages, the matrix profile analysis can be performed on many more sets of data over longer time periods and with higher dimensionality (identifying longer patterns). This makes the analysis scalable for use across multiple data sets for multiple levels of dimensionality, without having to build server farms for the processing.

Matrix Profile

Figure 3:
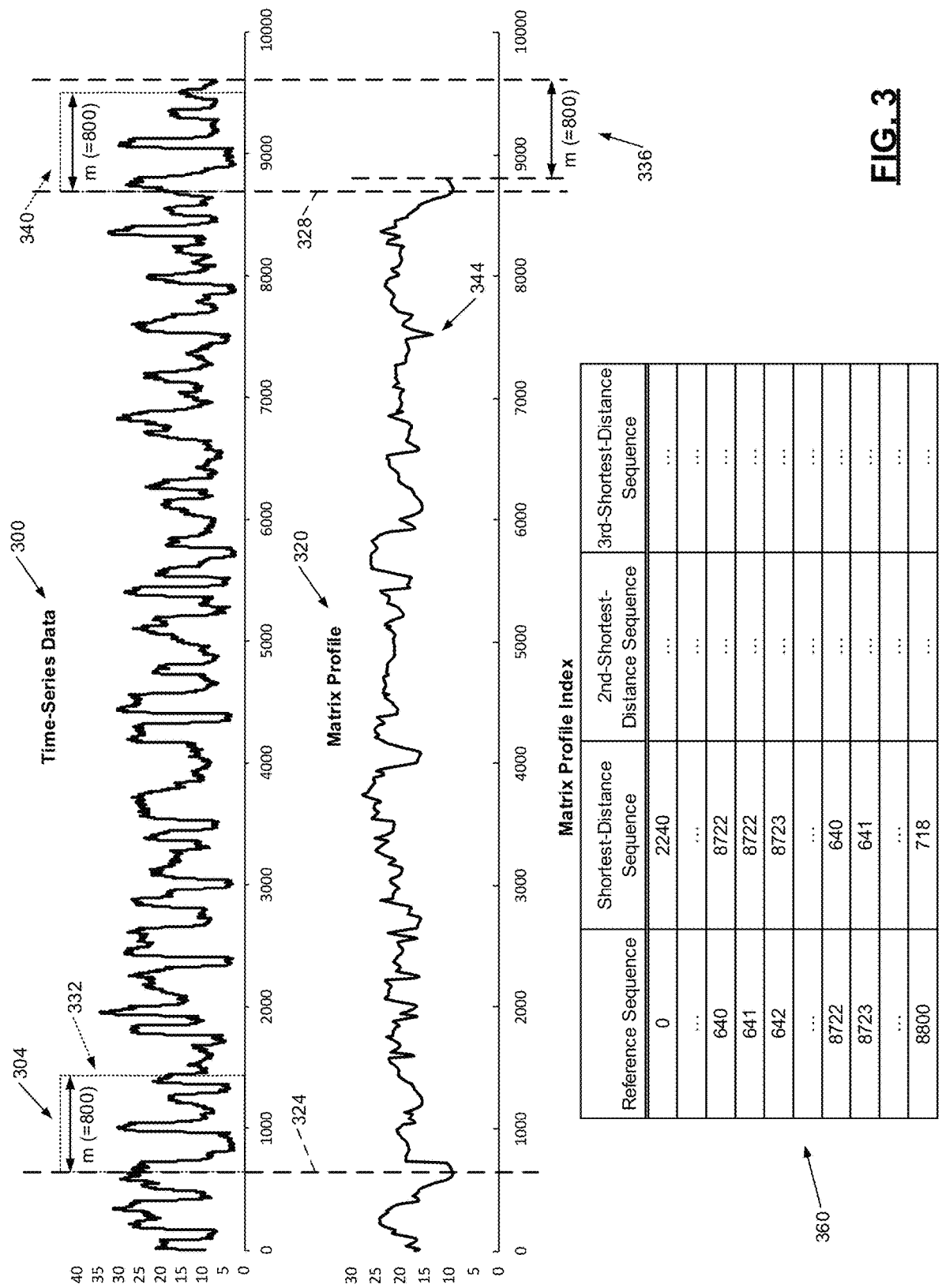
FIG. 3 is a graphical representation of time-series data to visually describe a matrix profile and a matrix profile index.

In FIG. 3, example time-series data 300 is plotted on an x-axis from 0 to 9600. This means that the full sequence includes 9601 data points (n=9601), each of which may correspond to an increment of time. For example, the time-series data may be the spot price of an equity or fund over the past 9600 minutes (160 hours). An indication 304 of length m demonstrates the subsequence length (also called pattern length) that will be studied in the time-series data 300. Once m is specified, a matrix profile 320 can be calculated in a manner that is very computationally and storage efficient. In this example, m is set to 800.

The matrix profile 320 is plotted on the same x-axis as the time-series data 300 and each value of the matrix profile 320 corresponds to a subsequence of length m in the time-series data 300. For illustration, lines 324 and 328 have been drawn at the global minima of the matrix profile 320. The value of the matrix profile 320 at line 324 corresponds to a subsequence of length m beginning in the time-series data 300 at line 324. This subsequence is shown at 332 using shading. Similarly, the value of the matrix profile 320 at line 328 corresponds to a subsequence 340, which is also of length m and shown using shading.

Because each value of the matrix profile 320 corresponds to a subsequence of the time-series data 300 of length m beginning at the data point indicated by the matrix profile 320, the matrix profile 320 will end m data points before the time-series data 300. In the example of FIG. 3, the time-series data extends from data point 0 to data point 9600 and the value used for m is 800, so the matrix profile 320 extends from 0 to 8800 (9600 minus 800). This 800-point difference in lengths is indicated at 336 by a double-headed arrow.

The value of the matrix profile 320 at line 324 is a measure of the similarity between the subsequence 332 and the most similar subsequence from among all the other possible subsequences of length m in the time-series data 300. In this instance, the subsequence 340 beginning at line 328 is most similar to the subsequence 332, so the value of the matrix profile 320 at line 324 is a measure of the similarity between the subsequences 332 and 340.

The similarity measure used by the matrix profile 320 is a z-normalized Euclidean distance. As a result, a lower value in the matrix profile 320 indicates a lower distance and therefore greater similarity. In an optimization that avoids performing the computationally-costly square root operation, the squared Euclidean distances of z-normalized subsequences may be used for relative comparisons in constructing the matrix profile. The process of z-normalization causes a subsequence to have a mean of 0 and a standard deviation of 1 and therefore allows the shapes of patterns to be compared without regard to differences in amplitude. In various implementations, the Euclidean distance calculation may omit z-normalization or may use a normalization process different from z-normalization.

In general, the value of the matrix profile 320 at a given location indicates the similarity of the subsequence in the time-series data 300 that is most similar to the subsequence beginning at the given location. Therefore, the lowest values of the matrix profile 320 indicate the subsequences in the time-series data 300 that have the most similar subsequences in the time-series data 300.

As mentioned above, lines 324 and 328 have been drawn at the lowest values of the matrix profile 320. Based on the definition of matrix profile 320, these lines 324 and 328 therefore mark the start of subsequences (the subsequence 332 and, also marked with shading, the subsequence 340) that are most similar within the time-series data 300.

When presented with the time-series data 300, identifying the two subsequences 332 and 340 as being most similar would be almost impossible using manual inspection. However, the minima of the matrix profile 320 immediately identify the subsequences 332 and 340 as being similar. In fact, when plotted graphically, the minima of the matrix profile 320 can even be visually identified, and the subsequences 332 and 340 corresponding to these minima can be visually verified as being similar. Note that the minima of the matrix profile may not always be this easy to visually identify. The matrix profile 320 also indicates other subsequences of the time-series data 300 that have a similar subsequence elsewhere. For example, see the local minimum at approximately data point 7500, indicated by reference numeral 344. The matrix profile 320 is therefore a set of data that readily identifies similar patterns and is even visually interpretable.

A brute-force approach to finding the subsequence 340 given the reference subsequence 332 would be to use a sliding window of length m starting at data point 0, proceeding to the final subsequence of the time-series data 300 (beginning at data point 8800), and comparing each of those candidate subsequences to the subsequence 332. For example, the z-normalized Euclidean distance between the subsequence 332 and each of the candidate subsequences can be calculated.

Then, the candidate subsequence that was most similar to (has the shortest z-normalized Euclidean distance to) the subsequence 332 is chosen and a measure of its similarity to the subsequence 332 can be recorded within the matrix profile 320. As explained in more detail below, the location of this candidate subsequence can be recorded in a matrix profile index. In fact, the k closest candidate subsequences can be identified for the subsequence 332, where k is an integer greater than or equal to one. The matrix profile can then have k values for each subsequence (including the subsequence 332). In addition, the matrix profile index may record where each of the k closest subsequences are located.

One restriction to consider is that a subsequence is identical to itself, and is usually very similar to a slightly shifted variant of itself. Therefore, an exclusion window around the reference subsequence is defined, and no candidate subsequence can be selected from that exclusion window. For example, the exclusion window may encompass any subsequence beginning within m/2 in either direction of the reference subsequence.

Such a brute-force search, even if highly optimized, is computationally prohibitive, especially as the value of m increases. However, the present disclosure relies on a much more computationally efficient calculation of the matrix profile and the matrix profile index, as described below.

To identify trends, separate left and right matrix profiles may be determined. The left matrix profile determines, for each reference subsequence, which subsequence (or, if k>1, which subsequences) present to the left of the reference subsequence is closest in distance (for example, z-normalized Euclidean distance). In other words, only subsequences that occurred earlier in time are considered for purposes of the left matrix profile. Meanwhile, the right matrix profile only identifies minimum-distance subsequences to the right of the reference subsequence. The standard matrix profile can be obtained from the left matrix profile and the right matrix profile simply by evaluating a point-by-point minimum function of the left and right matrix profiles.

Matrix Profile Index

Minimum values of the matrix profile 320 indicate which subsequences of the time-series data 300 have close matches within the time-series data 300 and maximum values indicate which subsequences are outliers, having no close matches. Meanwhile, a matrix profile index 360 indicates, for each subsequence, the position of the minimum-distance subsequence.

For illustration, the matrix profile index 360 is shown as a two-column table. The first column indicates the starting point of the reference subsequence while the second column indicates the starting point of the subsequence that corresponds to the reference subsequence—that is, the subsequence in the time-series data 300 whose distance to the reference subsequence is shortest.

While there is an entry in the matrix profile index 360 for each entry in the matrix profile 320, only the first, last, and a few intermediate entries are displayed in FIG. 3 due to space constraints. In various implementations, only the second column is stored, since the first column is simply a sequential row number. For example, the second column may be stored as an integer array.

In the example that is shown in FIG. 3, line 324 is located at data point 640 and the matrix profile index 360 indicates that the subsequence that is most similar to the subsequence 332 (which begins at data point 640) is the subsequence beginning at data point 8722 (the subsequence 340), both having length m. The lowest value of the matrix profile 320 indicates the subsequences that will be most similar to each other. While the similarity in this example is reciprocal (for the reference subsequence beginning at 640, the shortest-distance subsequence begins at 8722 and, for the reference subsequence beginning at 8722, the shortest-distance subsequence begins at 640), this is not always true for every pair of subsequences.

As an additional illustration, consider the local minimum indicated by 344. This local minimum means that the time-series subsequence starting at the position of the local minimum 344 is similar to another subsequence within the time-series data 300. The matrix profile index 360 can be indexed (such as by using the user interface of FIG. 4) by the position of the local minimum 344. The resulting value from the matrix profile index 360 indicates the starting point of the most similar subsequence within the time-series data 300.

In various implementations, the matrix profile and a matrix profile index may be calculated according to Chin-Chia Michael Yeh et al., "Matrix Profile I: All Pairs Similarity Joins for Time Series: A Unifying View that Includes Motifs, Discords and Shapelets," IEEE ICDM 2016, the entire disclosure of which is incorporated by reference. Further information is available in Yan Zhu et al., "Matrix Profile II: Exploiting a Novel Algorithm and GPUs to break the one Hundred Million Barrier for Time Series Motifs and Joins," EEE ICDM 2016, the entire disclosure of which is incorporated by reference. In other implementations, the matrix profile and the matrix profile index may be calculated according to Yan Zhu et al., "Matrix Profile XI: SCRIMP++: Time Series Motif Discovery at Interactive Speed," ICDM 2018, the entire disclosure of which is incorporated by reference. Additional information can be found in Yan Zhu et al., "Matrix Profile VII: Time Series Chains: A New Primitive for Time Series Data Mining", ICDM 2017, the entire disclosure of which is incorporated by reference.

User Interfaces

Figure 4:
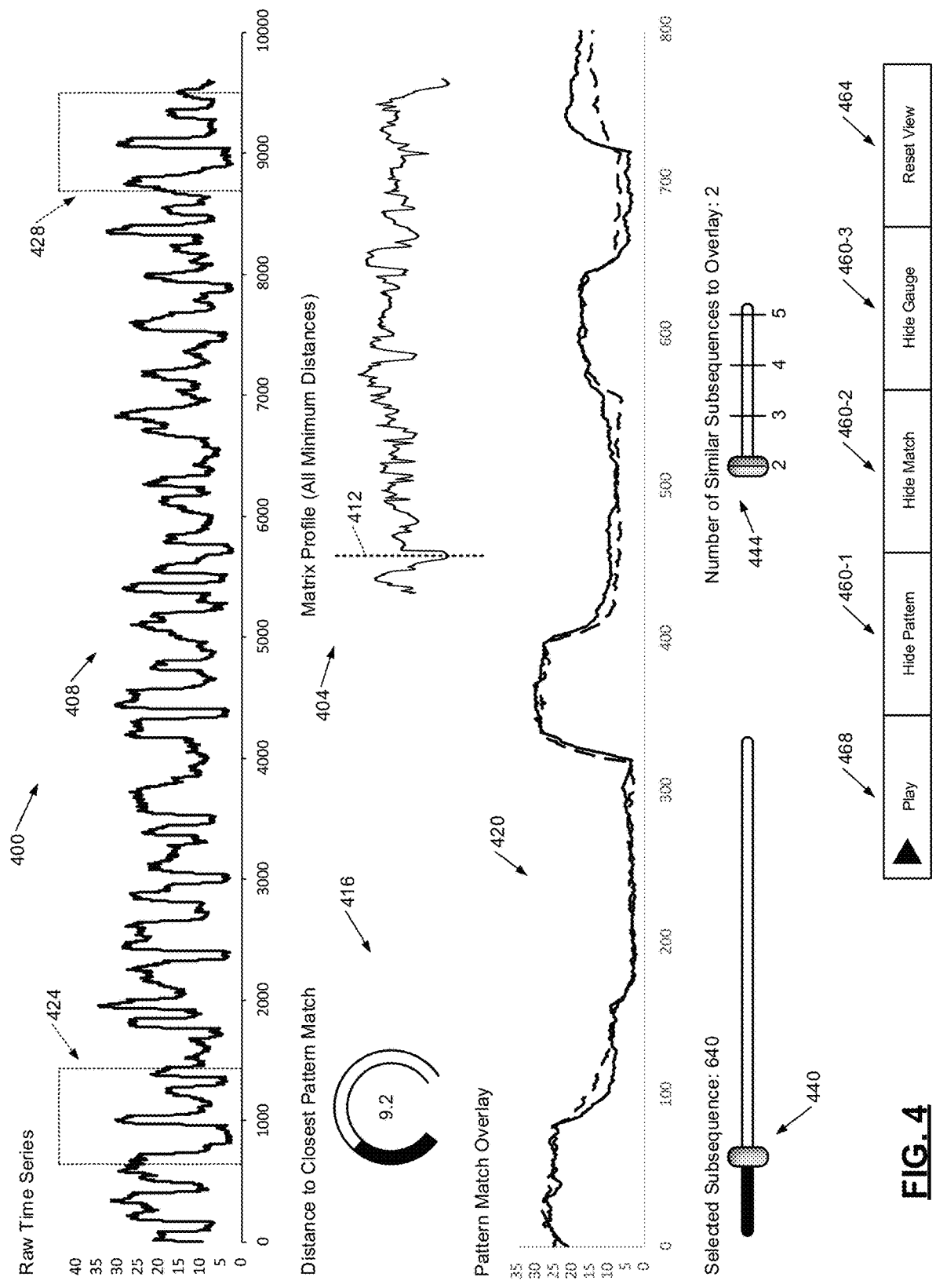
FIG. 4 is an example user interface of a pattern analysis system according to the principles of the present disclosure.

In FIG. 4, a user interface (UI) 400 uses the matrix profile 320 and the matrix profile index 360 of FIG. 3 to allow a user to graphically investigate patterns of interest. A matrix profile view 404 displays a plot of the matrix profile 320; in this configuration, the x-axis is not aligned with the x-axis of a data view 408 of the time-series data 300.

A specific location within the matrix profile view 404 is indicated by line 412. The UI 400 coordinates the data view 408, a position of the line 412, a distance indicator 416, and an overlay view 420. The line 412 indicates the matrix profile value for the reference subsequence (the reference subsequence is identified in the data view 408 by shaded region 424. The distance indicator 416 indicates a value of the distance between the reference subsequence and the corresponding closest subsequence. The matrix profile index 360 is used to identify the corresponding subsequence, which is then identified in the data view 408 by shaded region 428. Further, the regions 424 and 428 are plotted on the same set of axes in the overlay view 420.

Moving the line 412 in the matrix profile view 404 will cause updates to: the reference subsequence, as indicated by the region 424; the corresponding subsequence, as indicated by the region 428; and therefore the subsequences shown in the overlay view 420 and the distance indicator 416.

The distance indicator 416 may simply illustrate the value (9.2 in this example) of the matrix profile at line 412. The distance indicator 416 may have a numeric as well as a graphical indicator of the value. In some implementations, the subsequences in the overlay view 420 may be z-normalized. In other implementations, whether the patterns are z-normalized may be a user-selectable toggle.

A slider bar 440 indicates which subsequence is currently selected as the reference subsequence. The slider bar 440 may also permit the user to directly select the reference subsequence. In addition to the slider bar 440, the number to the right of the "Selected Subsequence:" text may be an editable textbox into which the user can type a specific subsequence.

The selected reference subsequence may also be updated based on other user inputs. For example, the selected reference subsequence may be adjusted as the user moves their pointer (generally, mouse or finger) across the data view 408 or the matrix profile view 404. The selected reference subsequence may be adjusted as the user drags the line 412 or the region 424. The selected reference subsequence may be adjusted as the user presses left or right arrow keys (which may be soft keys displayed on a touchscreen). The selected reference subsequence may be adjusted as the user moves their eyes using eye tracking technology.

A slider bar 444 allows the user to select how many closest subsequences are overlaid. The upper limit of the slider bar 444 may be established based on how many closest subsequences (referred to as k) were recorded during calculation of the matrix profile and the matrix profile index. In other implementations, the upper limit of the slider bar 444 may be higher than k. If the user selects a value with the slider bar 444 that is higher than k, k may be set to the selected value and the matrix profile and matrix profile index may be recalculated. To reduce the risk of an imminent recalculation, k may be set to a predetermined offset (such as 1) more than the selected value before the matrix profile and matrix profile index are recalculated.

Another slider bar (not shown) may be included to allow the user to control the length of the subsequence (referred to as m in FIG. 3 and set to a value of 800 in FIGS. 3 and 4). When the subsequence length slider bar is changed, the matrix profile and the matrix profile index will be recalculated. This may involve substantial computation, especially for longer subsequences. As a result, some matrix profiles may be precomputed for certain subsequence lengths. The user may be constrained to choose only those lengths. In other implementations, if the user deviates from one of the precomputed subsequence lengths, a prompt may be generated to warn that there may be a processing delay before proceeding.

The UI 400 may include UI elements to modify the UI 400. A UI element 460-1 may allow the user to toggle display of the data view 408, the overlay view 420, and/or the matrix profile view 404. Similarly, a UI element 460-2 may allow the user to toggle display of the data view 408, the overlay view 420, and/or the matrix profile view 404. A UI element 460-3 may allow the user to toggle display of the distance indicator 416. In various implementations, when the distance indicator 416 is hidden, the matrix profile view 404 will expand to full width and then will be aligned with the data view 408 of the time-series data.

A UI element 464 allows the user to reset the display, which may cause all of the view elements to be shown or a default set of view elements to be shown. In addition, resetting the display may reset the line 412 to one of the two minimum values within the matrix profile.

A UI element 468 may trigger playing an animated traversal of the time-series data from left to right. For example, playing the animated traversal may involve sliding the reference subsequence (the identity of which is numerically indicated at 440) toward the right of the data view 408. In various implementations, upon the UI element 468 being selected, the reference subsequence may be reset to the first subsequence (starting at position 0). In various implementations, pressing the spacebar may actuate the UI element 468.

Meanwhile, the line 412 within the matrix profile view 404 will follow the beginning location of the currently selected reference subsequence and the matrix profile index will be used to highlight a second subsequence of the data view 408 (the corresponding subsequence). In addition, the distance indicator 416 and the overlay view 420 will update based on the selected subsequences. The animation may slide the subsequence across the data view 408 at a constant speed. In various other implementations, the speed may decrease around selected minima of the matrix profile to emphasize subsequence similarity or to identify outliers. The selected minima may include the global minimum as well as any significant local minima. For example, a local minimum may be considered significant if it deviates by more than a threshold from a moving average of the matrix profile. The threshold may be dynamically calculated as a predetermined percentage of the moving average.

Figure 5:
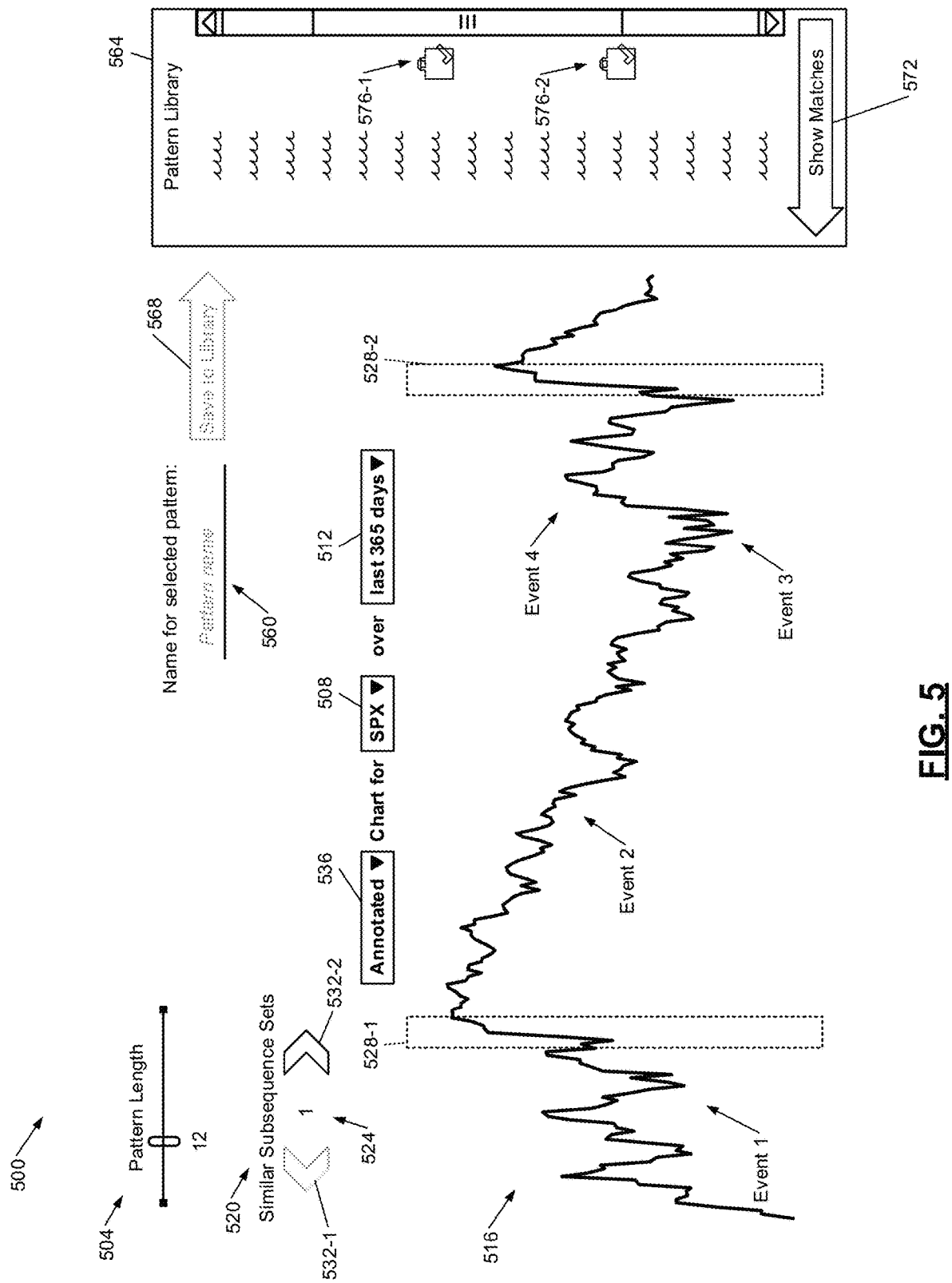
FIG. 5 is an example user interface of a pattern analysis system according to the principles of the present disclosure.

FIG. 5 is another example user interface (UI) 500 pattern analysis. A UI element 504 allows a user to specify a pattern length. In this example, the pattern length is set to 12. Based on that pattern length, a matrix profile and a matrix profile index are calculated. A time-series data set used to calculate the matrix profile and the matrix profile index is selected from a dropdown UI element 508. In this example, the time-series data may be closing prices of an S&P 500 index fund. A UI element 512 allows the user to select a length (for example, in units of time or samples) of the time-series data. The increment (in this example, days) may be determined based on the resolution of the time-series data. The UI element 512 may be prepopulated with values and/or the user may select a custom range.

A data view 516 plots the time-series data for the period of interest. Although not shown in FIG. 5, an overlay view, which may be similar to the overlay view 420 of FIG. 4, may also be included. A UI element 520 allows the user to step through similar sets of subsequences (if k=2, the sets can be referred to as pairs). A UI element, which may be similar to the slider bar 444 of FIG. 4 may allow the user to control the value of k: that is, the number of closest sequences to identify.

When the data view 516 is first shown, a first subsequence pair may be selected as indicated by a 1 at reference numeral 524. subsequence pairs may be ordered based on level of similarity, with the first subsequence pair being that pair that is most similar (corresponding to the lowest value of the matrix profile). The second subsequence pair may correspond to the next-lowest local minimum of the matrix profile. The selected subsequence pair at 524 selects a reference subsequence and a corresponding subsequence that are similar to each other. UI elements 532-1 and 532-2 allow the user to select subsequent or previous subsequence pairs. In FIG. 5, the first subsequence pair is already selected and therefore the UI element 532-1 is deactivated (indicated with the color gray).

Boxes 528-1 and 528-2 indicate the locations of the selected subsequences. The widths of the boxes 528-1 and 528-2 are equal to the pattern length (in this case, 12). In various implementations, the box 528-1 may be adjusted manually by the user. As the box 528-1 is adjusted, the matrix profile index may be used to identify the closest corresponding subsequence and then the box 528-2 would be placed to indicate the corresponding subsequence. If the user manually moves the box 528-1, the subsequence pair indicator 524 may be grayed out or otherwise visually modified to indicate that the subsequence sets are being manually selected, not using the UI element 520.

The UI could also present a reverse lookup. IN the case of a self-join, the UI could indicate how often a given subsequence appears in the top-k subsequences for other reference subsequences. This might allow the user to find generic subsequences that underpin many patterns but that may never match identically. This generic subsequence could be used to derive other patterns.

A UI element 536 allows the user to select whether the data view 516 is annotated or not. In addition, the type and form of annotations may be chosen. These annotations may be obtained from publicly available data, provided by the user, and/or obtained from data tracked by the trading control system 204. For example, the annotations may correspond to investor events, news events, etc. In FIG. 5, four events are shown and for illustration only are simply labeled with the generic "Event." In various implementations, annotations may replace the generic event language with a description of the event. Users may be able to obtain additional information about the event by hovering over the label (or the corresponding data point), clicking the label (or the corresponding data point), etc.

If the user identifies a pattern of interest (such as a pattern that precedes certain events that may drive investment decisions), the user can provide a name for that pattern at UI element 560 and then save the named pattern to a pattern library 564 using UI element 568. In FIG. 5, a pattern name has not been provided and therefore the UI element 568 for saving to the pattern library 564 is disabled (indicated by the color gray).

The pattern library 564 is shown with placeholders for the names of patterns. These patterns may have been previously stored by the user, made publicly available by other users, or have been specified by analysts, such as analysts using the analyst devices 220 of FIG. 2. In addition to saving patterns into the pattern library 564, the user may select patterns from the pattern library 564 and choose to show matches for those patterns in the data view 516. For example, a UI element 572 may identify the closest subsequences in the data view 516 to the selected patterns with boxes. If four patterns are selected, then four boxes may be displayed in the data view 516, with each box labeled by the pattern name. Overlay views, such as the overlay view 420 of FIG. 4, may be shown for each pattern to visually depict the similarity between the pattern and the closest subsequence within the data view 516 of time-series data.

In addition, a user may establish alerts for patterns within the pattern library. For example, indicators 576-1 and 576-2 may indicate that alerts are set for the corresponding patterns. In response to user selection of the indicator 576-1, parameters of the alert may be adjusted. For example, the parameters may allow the user to specify an update frequency, such as whether an alert should be sent immediately or at the end of a period such as a day. In addition, if immediate alerts are permitted, a gating time may be specified to indicate that a second alert should not be sent within some predetermined time interval of a first alert. For example, that predetermined time interval may be adjustable and set to 30 minutes.

The alert parameters may also specify which time-series data sets are being analyzed for the pattern. A given pattern may be relevant to a number of investments, such as the stocks of aluminum and steel companies. Individual investments or categories of investments or groups of investments may be selected within the alert parameters for a pattern in the pattern library 564. The alert parameters may also include upper and/or lower thresholds of the matrix profile that will trigger an alert.

Block Diagram

Figure 6:
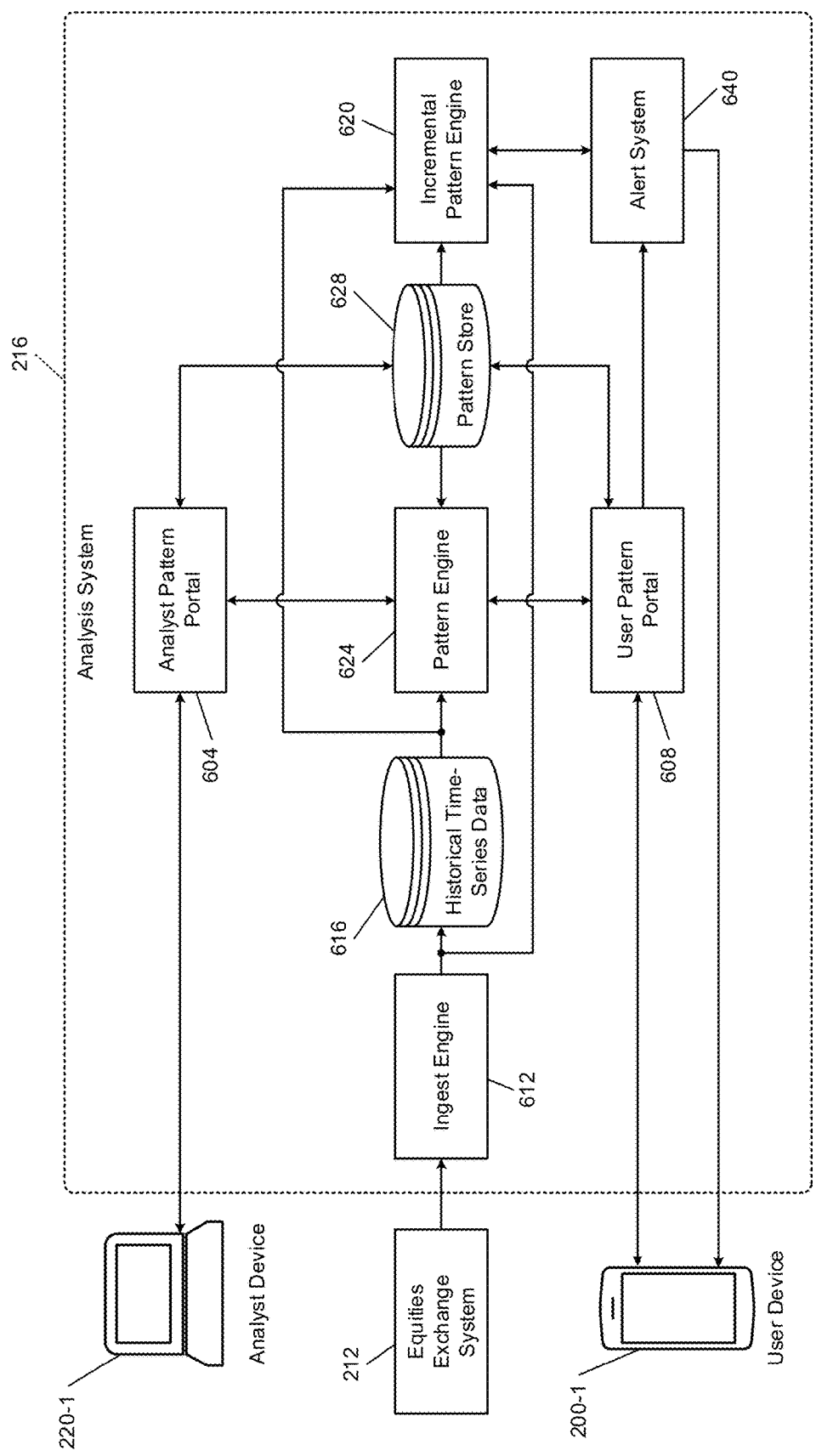
FIG. 6 is a functional block diagram of an example implementation of an analysis system of the present disclosure.

In FIG. 6, a functional block diagram of an example implementation of the analysis system 216 includes an analyst pattern portal 604 and a user pattern portal 608. The analyst pattern portal 604 and the user pattern portal 608 may be implemented as web portals and in fact may be the same portal. However, when a user authenticates, the user interface may be different from when an analyst authenticates. In various implementations, user interfaces for the analyst pattern portal 604 and/or the user pattern portal 608 may be rendered similarly to those shown in FIGS. 4 and 5.

An ingest engine 612 receives time-series data, such as from the equities exchange system 212. In various implementations, the time-series data may not be provided by the equities exchange system 212 directly but by a data provider. The ingest engine 612 may receive data in a format such as JSON (JavaScript object notation) through a public or private API (application programming interface). The ingest engine 612 processes the data, which may include standardizing a format of the data, interpolating for missing data, and other preprocessing operations, such as resampling the data to a different timescale.

The ingest engine 612 stores the preprocessed data into a data store 616 for historical time-series data. The ingest engine 612 may also provide the preprocessed data to an incremental pattern engine 620. A pattern engine 624 accesses time-series data from the data store 616 at the direction of the user pattern portal 608 and/or the analyst pattern portal 604. The pattern engine 624 calculates matrix profiles and matrix profile indices from selected time-series data. The incremental pattern engine 620 may also access the data store 616, such as when generating a matrix profile for a data set not previously analyzed.

The pattern engine 624 and the incremental pattern engine 620 may take advantage of parallel processing capabilities of the matrix profile and matrix profile index and may distribute computation across multiple threads, multiple cores, and multiple servers (which may be spread across multiple locations). In various implementations, some or all of the computation may be offloaded onto special-purpose circuitry or GPUs (graphics processing units).

In various implementations, the computation may be performed on the user's device (a concept sometimes referred to as edge computing). The user could marry their private data (without ever uploading it to a third party) with, for example, stock closing prices (supplied by the system operator) and compute matrix profiles directly on their user device.

A pattern store 628 may be populated by one or both of the analyst pattern portal 604 and the user pattern portal 608. Selected patterns from the pattern store 628 may be used by the pattern engine 624 for matrix profile calculation to identify similar subsequences within designated time-series data sets. From the user pattern portal 608, users can request alerts from an alert system 640. As described in more detail below, the alert system 640 requests that the incremental pattern engine 620 maintain a running matrix profile (and in various implementations, a running matrix profile index) for the time-series data sets of interest. The alert system 640 then selectively transmits alert messages to relevant user devices, such as the user device 200-1.

Flowcharts

Figure 7A:
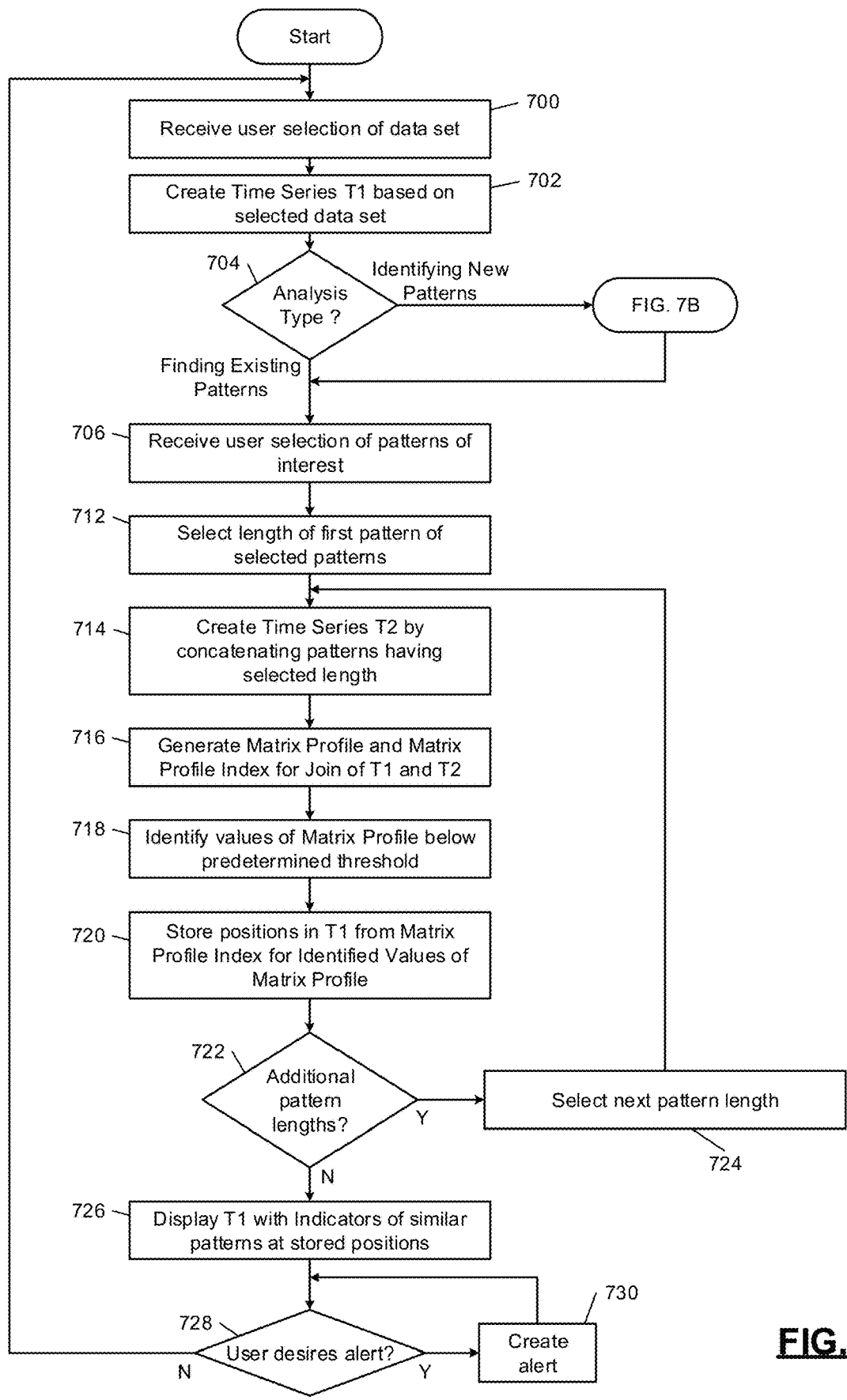
FIGS. 7A and 7B together form a flowchart of example operation performed by an implementation of the analysis system.

In FIG. 7A, example control of an analysis system begins at 700. At 700, control receives a user selection of the data set. For example, the data set may be closing prices of a certain stock for the past 12 months. At 702, control creates a time series, T1, based on the selected data set. For example, control may resample the data set to cause T1 to be periodically sampled. T1 may be a concatenation of related or unrelated data points. At 704, control determines what type of analysis the user is performing. If the analysis is finding existing patterns in data, control transfers to 706; otherwise, if the analysis is used to identify new patterns, control transfers to FIG. 7B.

At 706, control receives a user selection of patterns of interest. These patterns of interest may be selected from a pattern library, such as is stored in the pattern store 628 of FIG. 6.

At 712, control selects the length of the first pattern in the selected patterns. At 714, control creates a time series, T2, by concatenating patterns from the selected patterns that have the selected length. At 716, control generates a matrix profile and a matrix profile index for a join of T1 and T2. In various implementations, control may calculate a left matrix profile and a right matrix profile (and associated matrix profile indices). Further, control may identify and record the top-k matches, where k is an integer greater than or equal to 2.

Calculating the matrix profile (and matrix profile index) may produce false matches when the sliding window straddles two neighboring sequences. In various implementations, these overlapping regions may be ignored. For example, using domain knowledge to ignore portions of the matrix profile is described in Hoang Anh Dau et al., "Matrix Profile V: A Generic Technique to Incorporate Domain Knowledge into Motif Discovery," KDD 2017, the entire disclosure of which is incorporated by reference.

At 718, control identifies values of the matrix profile that are below a predetermined threshold. In other words, control identifies subsequences within T1 that have a predetermined level of similarity to the concatenated patterns in T2. At 720, control stores the positions within T1 from the matrix profile index for the identified values of the matrix profile. In other words, for each of the identified values of the matrix profile, control looks up the corresponding positions within T1 for those identified values. Control continues at 722, where control determines whether there are additional pattern lengths among the selected patterns. If so, control transfers to 724; otherwise, control transfers to 726. At 724, control selects the next pattern length and control returns to 714.

At 726, control displays T1 with indicators of the similar patterns according to the stored position data. For example, the indicator may label a subsequence with a box or other type of highlighting and may include a text description of which pattern was similar to the indicated subsequence. In various implementations, patterns may be color-coded so that similar subsequences can be colored the same as the corresponding pattern. This may be especially helpful when multiple patterns are active and multiple similar subsequences to each pattern are visible, since the resulting textual descriptions might become difficult to parse or even read.

Control continues at 728, where control determines whether the user desires an alert, such as based on one of the displayed patterns. If so, control transfers to 730; otherwise, control returns to 700. At 730, control provides a user interface for the user to specify alert parameters and control then creates the alert as described in more detail below. In various implementations, upon creation of an alert by the user, control of FIG. 8, described below, may be invoked. Control then returns to 728.

Figure 7B:
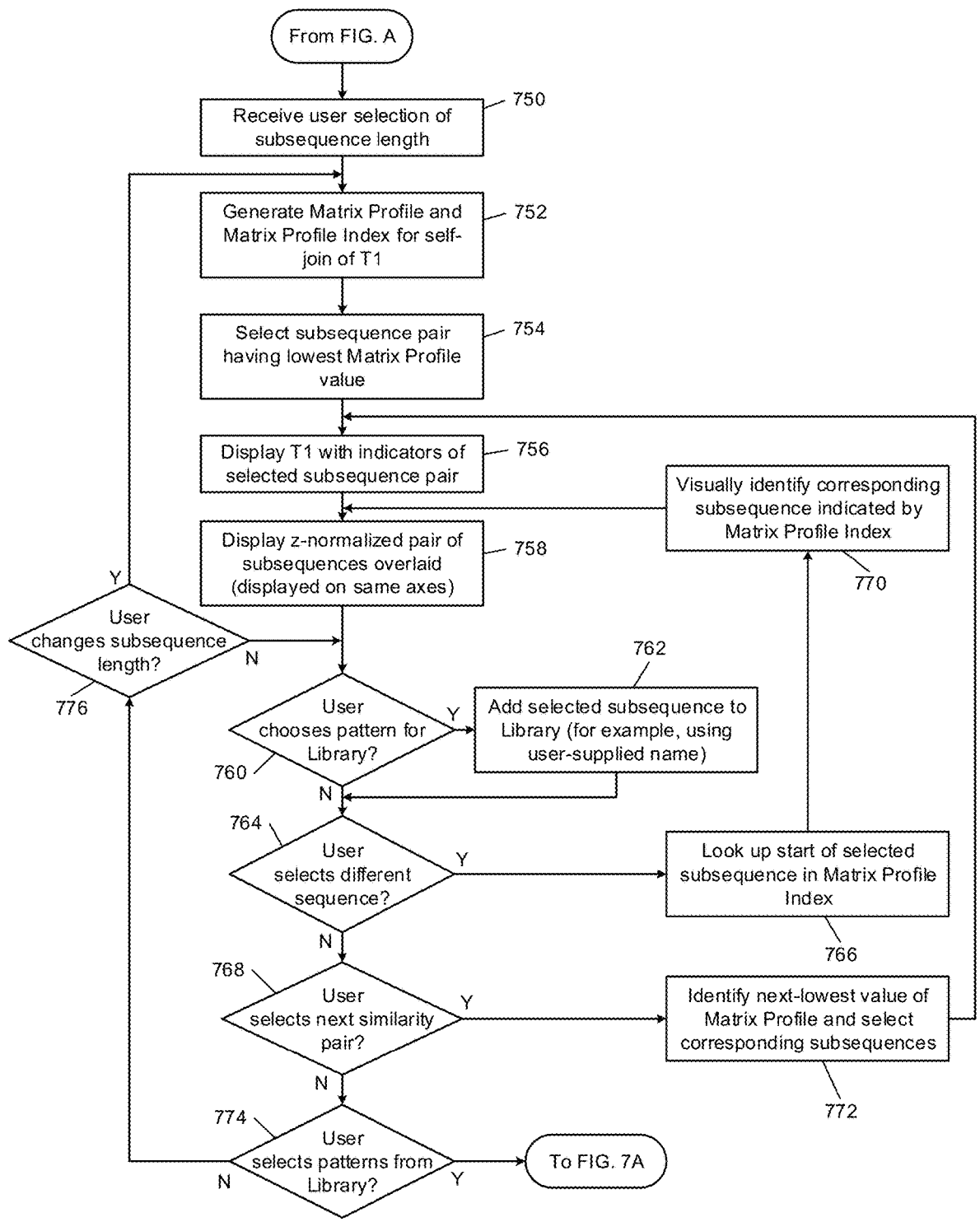

In FIG. 7B, control enters from FIG. 7A at 750. At 750, control receives a user selection of subsequence length (also referred to as pattern length). At 752, control generates a matrix profile and a matrix profile index for a self-join of T1. At 754, control selects a pair of subsequences having the lowest matrix profile value. At 756, control displays a plot of T1 with indicators of the selected subsequence pair. For example, boxes may outline the subsequences within T1.

At 758, control displays the selected pair of subsequences overlaid on each other (that is, displayed on the same axes). In various implementations, the pair of subsequences may be z-normalized before being overlaid to prevent disparities in amplitude from obscuring the similarity. At 760, control determines whether a user has identified a pattern for storage in the pattern library. If so, control transfers to 762; otherwise, control transfers to 764. At 762, control adds the selected subsequence to the library. The subsequence may be labeled using a user-supplied name. Control then continues at 764.

At 764, control determines whether the user has indicated selection of a different subsequence, such as by manually relocating a selection box. If so, control transfers to 766; otherwise, control transfers to 768. At 766, control looks up the beginning of the selected subsequence in the matrix profile index. Control continues at 770, where control visually identifies a corresponding subsequence starting at the value obtained from the matrix profile index. Control then continues at 758.

At 768, control determines whether the user has indicated a selection of a next similarity pair. If so, control transfers to 772; otherwise, control transfers to 774. At 772, control identifies a next-lowest value (for example, the next-lowest local minimum) and selects the reference subsequence at the location of the identified value. Then, using the matrix profile index, control selects the corresponding subsequence. Control then returns to 756. At 774, control determines whether the user has indicated a selection of patterns from the pattern library. If so, control returns to FIG. 7A to look for those patterns; otherwise, control transfers to 776. At 776, control determines whether the user has indicated a change to the subsequence length. If so, control returns to 752; otherwise, control transfers to 760.

Figure 8:
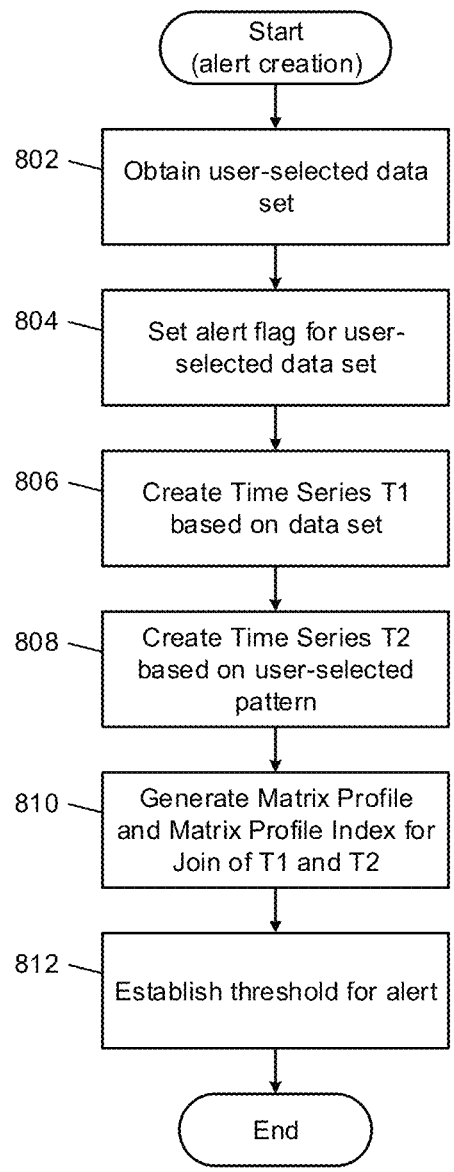
FIG. 8 is a flowchart showing creation of a new alert by an implementation of the analysis system.

In FIG. 8, control begins when a new alert is created by a user. Control begins at 802, where control obtains a time-series data set selected by the user. Control continues at 804, where control sets an alert flag for the user-selected data set. This alert flag indicates that when new data arrives for the selected data set, the data should be processed for potential transmission of an alert message. Control continues at 806, where control creates a time series, T1, based on the data set. Control continues at 808, where control creates a time series, T2, based on the user-selected pattern. Control continues at 810, where control generates a matrix profile and a matrix profile index for a join of T1 and T2.

Control continues at 812, where control establishes a threshold for the alert. For example, the threshold may be a predetermined value. This value may be domain specific and may be adjusted by a user. For example, a UI may allow the user to adjust the threshold to see which subsequences begin to be identified as the threshold decreases. The user can then set the threshold at a level where the user believes the number of identified false positives are minimal. This threshold may then be used for determining whether to alert the user. Control then ends.

Figure 9:
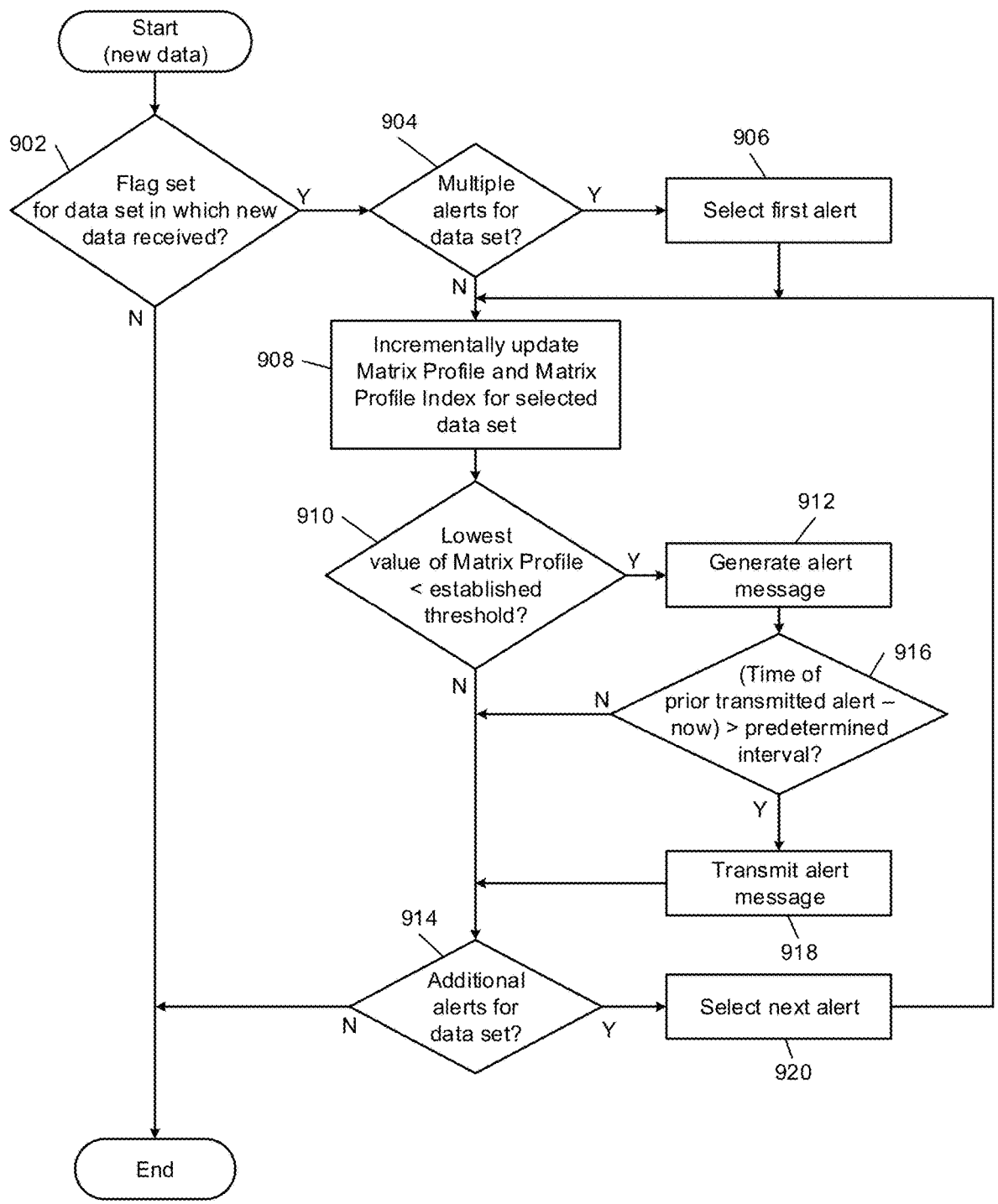
FIG. 9 is a flowchart of example alert message transmission by an implementation of the analysis system.

In FIG. 9, control begins at 902 when new data is received. At 902, control determines whether the flag is set for the data set that has received the new data. If so, control transfers to 904; otherwise, control ends. At 904, control determines whether multiple alerts have been set for the data set. If so, control transfers to 906; otherwise, control transfers to 908. At 906, control selects the first of the multiple alerts. In other words, control selects the pattern associated with the first alert. Control then continues at 908.

At 908, control incrementally updates the matrix profile and the matrix profile index for the selected data set based on the newly received data. In various implementations, the matrix profile may include both left and right matrix profiles. Further, in various implementations, the matrix profile may encompass the top-k matches. Control continues at 910, where the lowest value of the matrix profile is determined. If the lowest value is less than the established threshold for the selected alert, control transfers to 912; otherwise, control transfers to 914.

At 912, control generates an alert message based on the selected alert. The alert message may include information such as the data set, the name of the pattern, and the exact time at which the message is generated. Control then continues at 916. Control determines whether the difference between the time of the most recently transmitted prior alert and the present time is greater than a predetermined interval. If not, control transfers to 914. If the current alert is more than that predetermined interval since the most recent alert, control transfers to 918.

At 918, control transmits the alert message to the user. For example, the alert message may take the form of a text message, an email, a phone call, or some form of over-the-top messaging (such as WhatsApp messages). The alert may be displayed publicly, such as on a marquee for a movie theatre or a public billboard. The alert message may also be communicated through virtual reality or augmented reality.

In various implementations, the alert message may be transmitted using notification functionality of an app installed on the user's desktop computer, laptop computer, tablet, or smartphone. The notification may trigger a visual, audio, or haptic indicator to the user, such as on the user's smartphone or on a wearable device. Control then continues at 914. At 914, if additional alerts have been established for the data set, control transfers to 920; otherwise, control ends. At 920, control selects the next alert and returns to 908.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, CUDA, OpenGL, Rust and Python®.

The invention claimed is:

1. A system comprising:
   memory hardware; and
   processor hardware configured to execute code stored by the memory hardware implementing:
      a pattern engine configured to, in response to selection by a user of a first data set, generate a similarity self-join of the first data set for a specified length, wherein the similarity self-join indicates, for each reference subsequence of the specified length within the first data set, a minimum value of distances between the reference subsequence and other subsequences of the specified length within the first data set;
      a user portal configured to generate a user interface for display to the user, wherein the user interface:
         includes a visual representation of the first data set; and
         selectively visually identifies two subsequences within the first data set that correspond to a lowest value of the similarity self-join;
      an alert system configured to receive an alert request from the user, wherein the alert request specifies a second data set and a pattern specification, and wherein the pattern specification is characterized by a first length; and
      an incremental pattern engine configured to:
         generate an initial state of a similarity join of the second data set and the pattern specification, wherein the similarity join indicates, for each reference subsequence of the first length within the first data set, a distance between the pattern specification and the reference subsequence; and update the similarity join in response to data received for the first data set subsequent to the generation of the initial state, wherein the alert system is configured to, in response to data being received for the first data set:

identify whether any value of the similarity join meets a predetermined threshold, and in response to identifying a first value of the similarity join that meets the predetermined threshold, selectively transmit an alert message to the user.

2. The system of claim 1 wherein distance between two subsequences is calculated using z-normalized Euclidean distance.

3. The system of claim 1 wherein:

the similarity self-join generated by the pattern engine is a full similarity self-join of the first data set for the specified length; and the full similarity self-join indicates, for each reference subsequence of the specified length within the first data set, a minimum value of distances between the reference subsequence and all other subsequences of the specified length within the first data set.

4. The system of claim 1 wherein:

the pattern engine is further configured to generate an index having values that correspond one-to-one with values of the similarity self-join; and for each value of the similarity self-join:

the value indicates a subsequence that is closest to a corresponding reference sequence, and the corresponding value of the index identifies a position of the closest subsequence within the first data set.

5. The system of claim 4 wherein the user portal is configured to, in response to selection of a first subsequence:

select from the index the value corresponding to the first subsequence; and visually identify a second subsequence indicated by the selected value.

6. The system of claim 5 wherein the user portal is configured to generate a display overlaying a plot of the first subsequence and a plot of the second subsequence.

7. The system of claim 1 wherein:

the similarity self-join includes, for each reference subsequence, k values indicating distances between the reference subsequence and k closest subsequences in the first data set; and k is an integer greater than or equal to one.

8. The system of claim 7 wherein the user portal is configured to, in response to selection of a first subsequence, visually identify k subsequences that are closest in distance to the first subsequence.

9. The system of claim 8 wherein the user portal is configured to generate a display overlaying a plot of the first subsequence and plots of the k identified subsequences.

10. The system of claim 7 wherein the user portal is configured to update k according to input from the user.

11. The system of claim 1 wherein the user portal is configured to, in response to selection of a first subsequence, visually identify a second subsequence that is closest in distance to the first subsequence.

12. The system of claim 1 wherein:

the predetermined threshold is a maximum threshold; and the alert system is configured to transmit the alert message in response to a value of the similarity join being less than the predetermined threshold.

13. The system of claim 1 wherein the user portal is configured to generate a user interface element that, based on input from the user, adjusts the specified length.

14. The system of claim 1 wherein:

the first data set is time-series data with data points corresponding to monotonically increasing time; and the pattern engine is configured to generate:

a left self-join of the first data set for the specified length, wherein the left self-join indicates, for each reference subsequence of the specified length within the first data set, a minimum value of distances between the reference subsequence and other subsequences of the specified length prior to the reference subsequence within the first data set; and a right self-join of the first data set for the specified length, wherein the right self-join indicates, for each reference subsequence of the specified length within the first data set, a minimum value of distances between the reference subsequence and other subsequences of the specified length subsequent to the reference subsequence within the first data set.

15. A computerized method performed by processor hardware executing code stored by memory hardware, the method comprising:

in response to selection by a user of a first data set, generating a similarity self-join of the first data set for a specified length, wherein the similarity self-join indicates, for each reference subsequence of the specified length within the first data set, a minimum value of distances between the reference subsequence and other subsequences of the specified length within the first data set;

generating a user interface for display to the user, wherein the user interface:

includes a visual representation of the first data set; and selectively visually identifies two subsequences within the first data set that correspond to a lowest value of the similarity self-join;

receiving an alert request from the user, wherein the alert request specifies a second data set and a pattern specification, and wherein the pattern specification is characterized by a first length;

generating an initial state of a similarity join of the second data set and the pattern specification, wherein the similarity join indicates, for each reference subsequence of the first length within the first data set, a distance between the pattern specification and the reference subsequence;

updating the similarity join in response to data received for the first data set subsequent to generation of the initial state; and in response to data being received for the first data set:

identifying whether any value of the similarity join meets a predetermined threshold, and in response to identifying a first value of the similarity join that meets the predetermined threshold, selectively transmitting an alert message to the user.

16. The method of claim 15 further comprising determining the distance between each pair of subsequences by calculating z-normalized Euclidean distance between the pair of subsequences.

17. The method of claim 15 further comprising:
generating an index having values that correspond one-to-one with values of the similarity self-join, wherein, for each value of the similarity self-join:
the value indicates a subsequence that is closest to a corresponding reference sequence, and
the corresponding value of the index identifies a position of the closest subsequence within the first data set; and
in response to user selection of a first subsequence:
selecting from the index the value corresponding to the first subsequence; and
visually identifying a second subsequence indicated by the selected value.

18. The method of claim 15 wherein:
generating the similarity self-join includes, for each reference subsequence, storing k values indicating distances between the reference subsequence and k closest subsequences in the first data set;
k is an integer greater than or equal to one that is adjusted according to input from the user; and
the method further comprises, in response to selection of a first subsequence, identifying k subsequences that are closest in distance to the first subsequence and generating a display overlaying a plot of the first subsequence and plots of the k identified subsequences.

19. The method of claim 15 wherein:
the first data set is time-series data with data points corresponding to monotonically increasing time; and
generating the similarity self-join includes generating:
a left self-join of the first data set for the specified length, wherein the left self-join indicates, for each reference subsequence of the specified length within the first data set, a minimum value of distances between the reference subsequence and other subsequences of the specified length prior to the reference subsequence within the first data set; and
a right self-join of the first data set for the specified length, wherein the right self-join indicates, for each reference subsequence of the specified length within the first data set, a minimum value of distances between the reference subsequence and other subsequences of the specified length subsequent to the reference subsequence within the first data set.

20. A non-transitory computer-readable medium comprising instructions including:
in response to selection by a user of a first data set, generating a similarity self-join of the first data set for a specified length, wherein the similarity self-join indicates, for each reference subsequence of the specified length within the first data set, a minimum value of distances between the reference subsequence and other subsequences of the specified length within the first data set;
generating a user interface for display to the user, wherein the user interface:
includes a visual representation of the first data set; and
selectively visually identifies two subsequences within the first data set that correspond to a lowest value of the similarity self-join;
receiving an alert request from the user, wherein the alert request specifies a second data set and a pattern specification, and wherein the pattern specification is characterized by a first length;
generating an initial state of a similarity join of the second data set and the pattern specification, wherein the similarity join indicates, for each reference subsequence of the first length within the first data set, a distance between the pattern specification and the reference subsequence;
updating the similarity join in response to data received for the first data set subsequent to generation of the initial state; and
in response to data being received for the first data set:
identifying whether any value of the similarity join meets a predetermined threshold, and
in response to identifying a first value of the similarity join that meets the predetermined threshold, selectively transmitting an alert message to the user.

* * * * *